United States Patent [19]

Dimora et al.

[11] Patent Number: 4,659,130
[45] Date of Patent: Apr. 21, 1987

[54] AUTOMATICALLY POSITIONABLE SPOILER FOR A MOTOR VEHICLE

[75] Inventors: Leonardo Dimora, Milan; Emanuele Minutillo, Saronno, both of Italy

[73] Assignee: Alfa Romeo Auto S.p.A., Napoli, Italy

[21] Appl. No.: 555,021

[22] Filed: Nov. 25, 1983

[30] Foreign Application Priority Data

Dec. 10, 1982 [IT] Italy ................ 24678 A/82

[51] Int. Cl.⁴ ............................................ B62D 37/02
[52] U.S. Cl. ................................. 296/1 S; 293/118
[58] Field of Search .............. 296/1 S, 91; 293/117, 293/118, 103, 104, 107, 131; 105/2 A, 2 R; 16/285, 297; 244/75 A

[56] References Cited

U.S. PATENT DOCUMENTS

| | | | |
|---|---|---|---|
| 1,715,590 | 6/1929 | Burhenne | 16/297 X |
| 1,940,099 | 12/1933 | Preston | 16/297 |
| 2,087,426 | 7/1937 | Bechereau et al. | 244/75 A |
| 3,618,998 | 11/1971 | Swauger | 296/1 S |
| 3,847,427 | 11/1974 | Eshelman | 293/118 |
| 3,884,516 | 5/1975 | Gallion et al. | 296/1 S |
| 4,131,308 | 12/1978 | Holka et al. | 296/1 S |
| 4,159,140 | 6/1979 | Chabot et al. | 296/1 S |
| 4,398,764 | 8/1983 | Okuyama | 296/1 S |
| 4,460,213 | 7/1984 | Janssen et al. | 296/1 S |

FOREIGN PATENT DOCUMENTS 3145258 5/1983 Fed. Rep. of Germany ...... 296/1 S

Primary Examiner—Robert B. Reeves
Assistant Examiner—Russell D. Stormer
Attorney, Agent, or Firm—Charles E. Brown; Charles A. Brown

[57] ABSTRACT

The invention relates to a spoiler for the air which flows below a moving motor vehicle. The spoiler is rotatably supported by an element rigid with the vehicle body by way of an elastic device, and is characterized by being further connected to the element by way of a vibration damping device.

5 Claims, 4 Drawing Figures

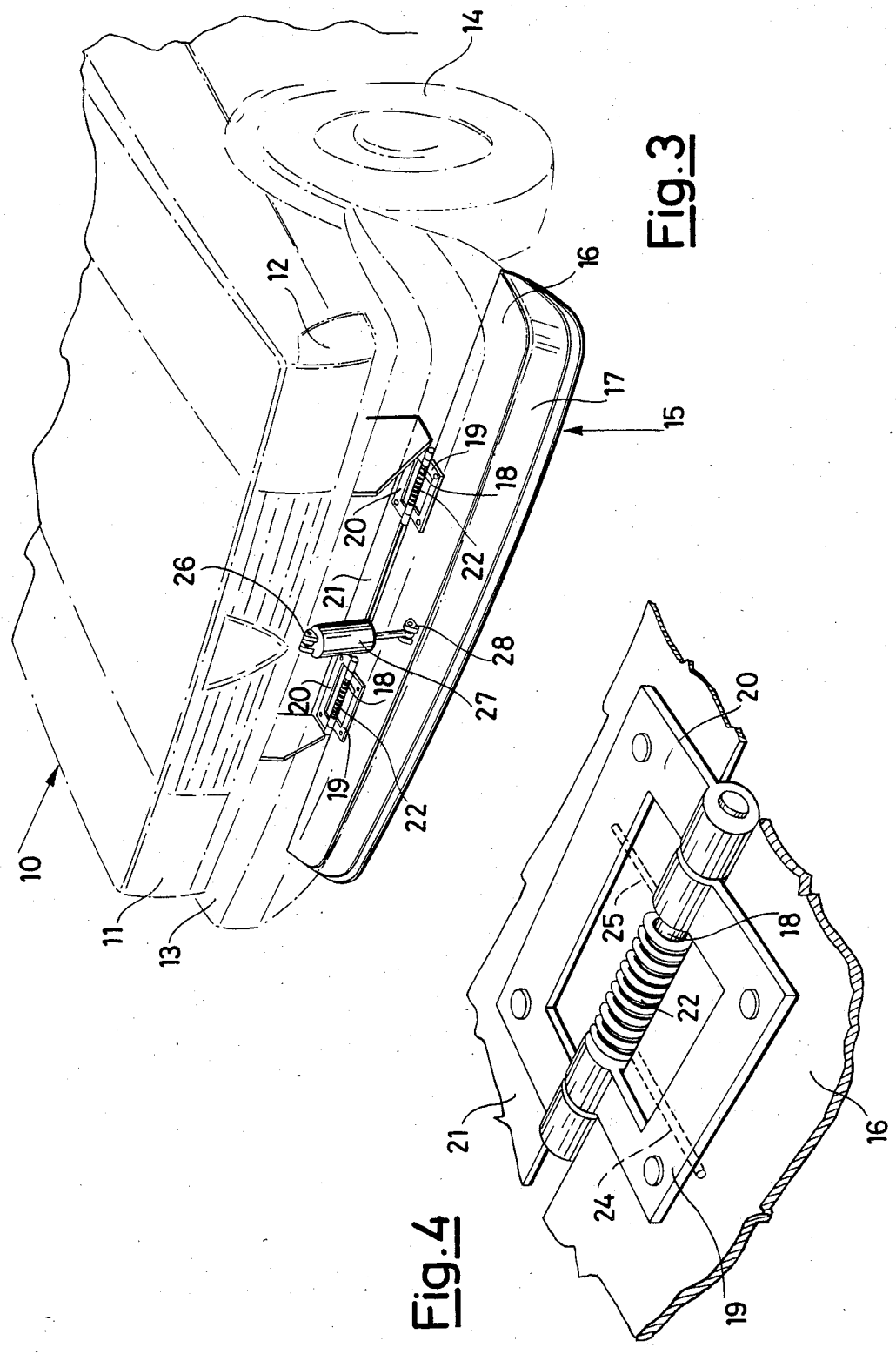

AUTOMATICALLY POSITIONABLE SPOILER FOR A MOTOR VEHICLE

This invention relates to an aerodynamic appendix, known as a spoiler, for intercepting the air which flows below a moving motor vehicle. Said spoiler is located in a position corresponding with the front end of said motor vehicle, and is able to automatically assume an active position when a determined vehicle driving speed is exceeded.

The use of front or rear spoilers is known to be one of the most effective systems for reducing the aerodynamic resistance and lift which are suffered by motor vehicles especially at high speed. Generally, the front spoiler is located below the motor vehicle front end in order to intercept the air flow between the underbody and the ground. The air is thus compelled to pass through a restricted section where its speed increases, whereas its pressure decreases (Venturi effect). Consequently, the zone occupied by the spoiler and that immediately to its rear are characterised by strong localised negative pressure, which has the effect of creating a downwardly directed force on the front part of the motor vehicle, with the result of increasing the load on the front wheels and reducing the lift.

In most cases, the increased diving attitude of the vehicle also leads to a resistance reduction, because the form is more aerodynamic.

The presence of a front spoiler also has a fairing effect, and thus reduces resistance due to the numerous projections present on the underbody (suspension arms, bars etc.) without increasing the front cross-section.

As stated, the positive effects of spoilers on the aerodynamics of a motor vehicle are considerable at high speed, whereas at low speed they are practically zero. It can in fact happen that at low speed, the front spoiler constitutes an uncomfortable appendix because it can interfere with the ground if travelling over humps or depressions, and can thus suffer collision.

In order to obviate the possible drawbacks of front spoilers, it has been proposed to use mobile spoilers which automatically assume an active position when a determined vehicle driving speed is exceeded. These spoilers are rotatably supported by an element rigid with the vehicle body by way of elastic means which keep them raised when in their rest position. When the vehicle is moving, an overpressure arises at its front, and increases with the driving speed. The resultant force acts on the spoiler with the torque which is able to rotate it downwards against the action of the elastic return means, when the vehicle speed exceeds a predetermined value. The spoiler thus automatically assumes its active position in order to intercept air passage between the underbody and ground.

Spoilers constructed in this manner can behave in an unstable and thus less efficient manner because of vibrations transmitted by the vehicle body, especially in the case of variations in the dynamic load on the vehicle or if the ground is rough. Our research has shown that the aforesaid limitations of mobile spoilers can be obviated by connecting them to an element rigid with the vehicle body by way of damping means which nullify the vibrations and keep the spoilers stable in any position.

The invention is described hereinafter with reference to FIGS. 1 to 4 which show a preferred embodiment of the invention by way of non-limiting example.

FIG. 3 is a substantially front view of the motor vehicle of FIG. 1;

FIG. 4 shows an enlarged detail of the spoiler according to the invention.

Figure 1:
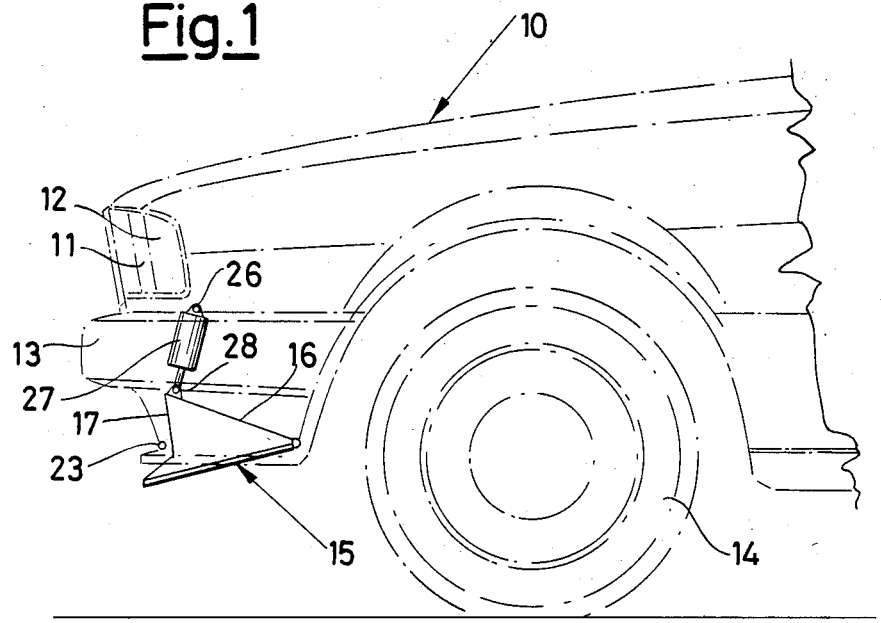
FIG. 1 is a side view of the front part of the motor vehicle provided with a spoiler constructed according to the invention.

In FIG. 1, the reference numeral 10 indicates overall the front part of a motor vehicle, shown by dashed and dotted lines. The reference numeral 11 indicates the headlamps, 12 the direction indicators, 13 a bumper, and 14 a wheel.

The reference numeral 15 indicates a spoiler disposed below the vehicle front end. The spoiler is constituted by a substantially horizontal flat wall 16 and a substantially vertical L-shaped wall 17. Brackets 19 are rigid with the wall 16 of the spoiler 15 in order to rotatably support this latter by way of pins 18, which are supported by brackets 20 rigid with the sheet metal cross-member 21 of the vehicle body. Spiral springs 22 are mounted on the pins 18, and have their end turns provided with fins (such as those indicated by 24 and 25 in FIG. 4), which engage with the wall 16 of the spoiler 15 and with the wall of the sheet-metal cross-member 21.

The springs 22 are preloaded in order to exert on the spoiler 15 the return force necessary to keep it raised in its rest position against the lower edge of the bumper 13, with which it is in sealed contact by virtue of a rubber strip 23 provided on said bumper. The rod of a shock absorber 27 is pivoted at 28 to the wall 16 of the spoiler 15 on the center line 29 thereof, the shock absorber itself being pivoted to the vehicle body at 26. When the shock absorber is completely extended, it acts as a lower limit stop for the spoiler 15.

When the motor vehicle is moving, an overpressure arises in the front end zone and increases with the driving speed. The resultant force on the wall 17 of the spoiler 15 provides a torque (anticlockwise in the figure) which overcomes the reaction of the springs 22 and causes the spoiler to rotate downwards when the overpressure (and thus the vehicle speed) exceeds the value determined by the preloading of the springs 22.

The spoiler 15 is kept stable both in its rest position and its active position by the shock absorber 27, which nullifies vibration transmitted by the vehicle body.

Figure 2:
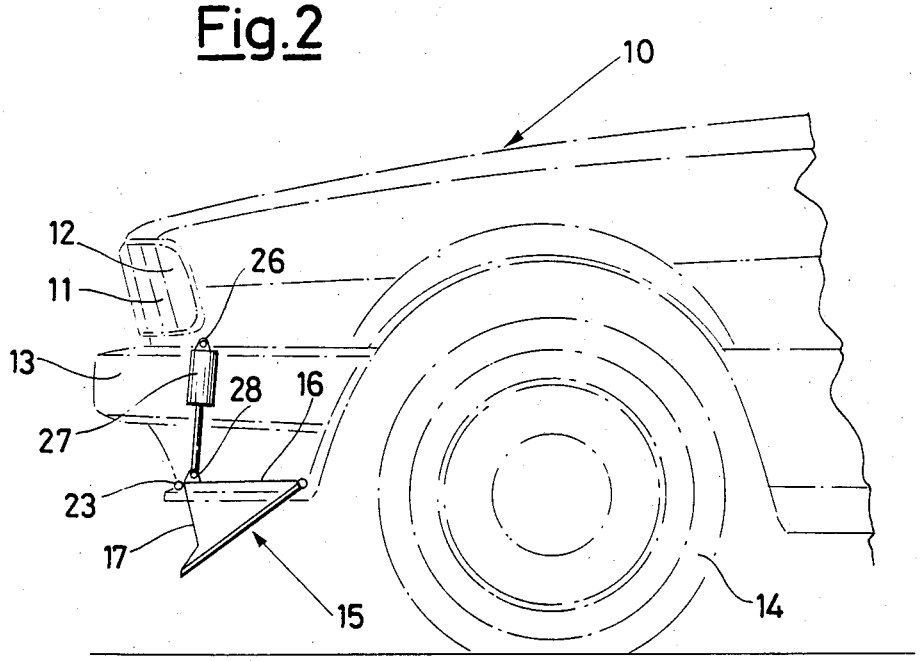
FIG. 2 is a view analogous to that of FIG. 1, with the spoiler in its active position.

When the spoiler 15 is in its active position, as shown in FIGS. 2 and 3, it intercepts air passage below the motor vehicle between the underbody and ground, to locally create a zone of negative pressure which has the effect of reducing the lift on the vehicle. When the spoiler is in its lowered position, it also leads to a reduction in aerodynamic resistance, partly because of the increased diving attitude of the vehicle and partly because of the fairing effect towards the projections present on the underbody.

The resultant advantages include higher maximum vehicle speed for equal engine delivered powers, and a saving in fuel consumption.

We claim:

1. A front spoiler for a motor vehicle having a body including a front end, said spoiler being mounted on said motor vehicle below said front end, said spoiler being supported by an element rigid with said body by elastic means for normally maintaining said spoiler in an upper rest position, said spoiler including a normally substantially horizontal flat upper wall having front and rear edges and a normally substantially vertical front wall connected to said flat wall along said front edge, said front wall being L-shaped in cross section and terminating in a lower forwardly directed flange, said elastic means being disposed adjacent said flat wall rear edge, and dampening means extending between said spoiler and said body for dampening vibrations transmitted to said spoiler by said body, said dampening means being in the form of a shock absorber extending between and pivotally connected to said spoiler and said element rigid with said body, said shock absorber is disposed generally vertically and has a lower end connected to said flat wall.

2. A spoiler as claimed in claim 1 wherein said elastic means are in the form of pairs of brackets joined by pins at one end of said brackets and with the other end of said brackets being urged apart by spring means.

3. A spoiler as claimed in claim 2 wherein said spring means are preloaded.

4. A front spoiler according to claim 1 wherein said shock absorber is disposed generally vertically and has a lower end connected to said flat wall adjacent said front edge.

5. A front spoiler according to claim 1 wherein said shock absorber is located centrally of said spoiler.

* * * * *